United States Patent
Vogel et al.

(10) Patent No.: US 9,792,516 B2
(45) Date of Patent: Oct. 17, 2017

(54) FLEXIBLE CARD WITH FINGERPRINT SENSOR

(71) Applicant: NEXT BIOMETRICS GROUP ASA, Oslo (NO)

(72) Inventors: Kolja Vogel, Munich (DE); Jamie Lyn Shaffer, Bothell, WA (US)

(73) Assignee: NEXT BIOMETRICS GROUP ASA, Oslo (NO)

( * ) Notice: Subject to any disclaimer, the term of this patent is extended or adjusted under 35 U.S.C. 154(b) by 0 days.

(21) Appl. No.: 15/006,713

(22) Filed: Jan. 26, 2016

(65) Prior Publication Data
US 2017/0213097 A1    Jul. 27, 2017

(51) Int. Cl.
G06K 9/00    (2006.01)
G06K 9/20    (2006.01)

(52) U.S. Cl.
CPC ......... *G06K 9/209* (2013.01); *G06K 9/00013* (2013.01); *G06K 9/00087* (2013.01)

(58) Field of Classification Search
CPC . G06K 9/209; G06K 9/00013; G06K 9/00087
See application file for complete search history.

(56) References Cited

U.S. PATENT DOCUMENTS

| | | |
|---|---|---|
| 6,088,471 A | 7/2000 | Setlak et al. |
| 6,091,837 A | 7/2000 | Dinh |
| 6,494,380 B2 | 12/2002 | Jarosz |
| 6,547,130 B1 | 4/2003 | Shen |
| 6,657,269 B2 | 12/2003 | Migliorato et al. |
| 6,667,439 B2 | 12/2003 | Salatino et al. |
| 7,013,031 B2 | 3/2006 | Kim et al. |
| 7,049,166 B2 | 5/2006 | Salatino et al. |
| 7,090,139 B2 | 8/2006 | Kasuga et al. |
| 7,333,637 B2 | 2/2008 | Walfridsson |
| 7,910,902 B2 | 3/2011 | Dinh |

(Continued)

FOREIGN PATENT DOCUMENTS

CN    201548972 U    8/2010
CN    103164728 A    6/2013
(Continued)

OTHER PUBLICATIONS

Next Biometrics Group ASA, Next Biometrics Fingerprint Area Sensor Module, NB-2020-S Product Literature, (2015), p. 1.
(Continued)

*Primary Examiner* — Gregory M Desire
(74) *Attorney, Agent, or Firm* — Duane Morris LLP

(57) ABSTRACT

A prelam layer for use in forming a laminated card includes a flexible circuit substrate; a fingerprint sensor disposed on the flexible circuit substrate, the fingerprint sensor having upper and bottom surfaces, the bottom surface of the fingerprint sensor being disposed on the substrate, an active layer of the fingerprint sensor disposed towards the upper surface of the fingerprint sensor; a first integrated circuit chip disposed on the substrate and having at least one lead electrically connected to the flexible circuit substrate; and an adapter flexible circuit electrically bonded to the active layer of the fingerprint sensor. The integrated circuit chip is adapted to communicate with the fingerprint sensor through the adapter flexible circuit.

25 Claims, 6 Drawing Sheets

(56) References Cited

U.S. PATENT DOCUMENTS

| | | | |
|---|---|---|---|
| 9,569,654 B2 * | 2/2017 | Benkley, III | G06K 9/00053 |
| 9,632,537 B2 | 4/2017 | Memering et al. | |
| 9,651,513 B2 * | 5/2017 | Dunlap | G01N 27/221 |
| 9,697,409 B2 | 7/2017 | Myers | |
| 2004/0234111 A1 | 11/2004 | Mueller | |
| 2006/0113381 A1 | 6/2006 | Hochstein et al. | |
| 2009/0153297 A1 | 6/2009 | Gardner | |
| 2010/0053114 A1 | 3/2010 | Kaigawa | |
| 2010/0118131 A1 | 5/2010 | Lee et al. | |
| 2011/0309482 A1 * | 12/2011 | Salatino | G06K 9/00053 |
| | | | 257/659 |
| 2012/0049309 A1 | 3/2012 | Kiyomoto | |
| 2014/0219523 A1 | 8/2014 | Perezselsky et al. | |
| 2014/0333328 A1 * | 11/2014 | Nelson | G06F 3/044 |
| | | | 324/663 |
| 2015/0036897 A1 | 2/2015 | Benkley, III | |
| 2015/0187707 A1 * | 7/2015 | Lee | H01L 23/562 |
| | | | 324/663 |
| 2015/0296622 A1 * | 10/2015 | Jiang | G01L 1/2268 |
| | | | 361/750 |
| 2015/0347806 A1 * | 12/2015 | Li | H01L 24/17 |
| | | | 257/414 |
| 2016/0247009 A1 * | 8/2016 | Lu | G06K 9/00 |

FOREIGN PATENT DOCUMENTS

| | | |
|---|---|---|
| CN | 203118024 U | 8/2013 |
| CN | 203149624 U | 8/2013 |
| CN | 104102902 A | 10/2014 |
| CN | 2042424183 U | 4/2015 |
| CN | 103400181 B | 1/2016 |
| DE | 19921231 A1 | 11/2000 |
| DE | 102004011960 A1 | 9/2005 |
| DE | 102004011548 B4 | 2/2015 |
| EP | 1074949 B1 | 6/2003 |
| EP | 1800243 B1 | 8/2010 |
| JP | 2000123143 A | 4/2000 |
| JP | 2002222407 A2 | 8/2002 |
| JP | 3592487 B2 | 11/2004 |
| JP | 2005301407 A | 10/2005 |
| JP | 2006072890 A | 3/2006 |
| JP | 2006119810 A | 5/2006 |
| JP | 2006119811 A | 5/2006 |
| JP | 2006134086 A | 5/2006 |
| JP | 1513511 B2 | 7/2010 |
| JP | 2015082217 A | 4/2015 |
| KR | 20150019628 A | 2/2015 |
| KR | 20150065167 A | 6/2015 |
| TW | 200539045 A | 12/2005 |
| TW | 201514863 A | 4/2015 |
| TW | 201528912 A | 7/2015 |
| WO | 2006103070 A1 | 10/2006 |
| WO | 2013020230 A1 | 2/2013 |
| WO | 2015056979 A1 | 4/2015 |

OTHER PUBLICATIONS

PCT International Search Report and Written Opinion dated Oct. 20, 2016 in corresponding PCT International Application No. PCT/IB2016/000217, pp. 1-8.

Search Report issued on Aug. 16, 2017 in corresponding ROC (Taiwan) Patent Application No. 106101768, pp. 1-5.

* cited by examiner

FLEXIBLE CARD WITH FINGERPRINT SENSOR

FIELD OF THE INVENTION

The present disclosure relates to biometric sensors and more particularly to integration of biometric sensors chip sets on a card.

BACKGROUND OF THE INVENTION

Fingerprint sensing and matching is a reliable and widely used technique for personal identification or verification. In particular, a common approach to fingerprint identification involves scanning a sample fingerprint to obtain an image thereof and storing the image and/or unique characteristics of the fingerprint image. The characteristics of a sample fingerprint may be compared to information for reference fingerprints already in a database to determine proper identification of a person, such as for verification purposes.

One class of fingerprint sensors is based on the active thermal sensing principle as described in, for example, U.S. Pat. No. 6,091,837 entitled "Sensor For Acquiring a Fingerprint" issued Jul. 18, 2000 and U.S. Pat. No. 7,910,902 entitled "Apparatus for Fingerprint Sensing" issued Mar. 22, 2011, the entirety of each of which is hereby incorporated by reference herein.

There are challenges for integrating a biometric fingerprint chipset into a biometric system on card (BSoC). One challenge is that the active side of the fingerprint sensor must necessarily be oriented in the upward direction because direct contact with the finger is needed. This orientation necessitates the use of wire-bonding where electrical contact to the active side is established by wires bonds. But wire bonding techniques have high cost, low yield, and reliability disadvantages.

SUMMARY OF THE INVENTION

In embodiments, a prelam layer for use in forming a laminated card, includes a flexible circuit substrate; a fingerprint sensor disposed on the flexible circuit substrate, the fingerprint sensor having upper and bottom surfaces, the bottom surface of the fingerprint sensor being disposed on the substrate, an active layer of the fingerprint sensor disposed towards the upper surface of the fingerprint sensor; a first integrated circuit chip disposed on the substrate and having at least one lead electrically connected to the flexible circuit substrate; and an adapter flexible circuit electrically bonded to the active layer of the fingerprint sensor, wherein the integrated circuit chip is adapted to communicate with the fingerprint sensor through the adapter flexible circuit.

In embodiments, a biometric system on card comprises at least one bottom lamination layer, and a prelam layer disposed over the at least one bottom lamination layer. The prelam layer comprises a flexible circuit substrate; a fingerprint sensor disposed on the flexible circuit substrate, the fingerprint sensor having upper and bottom surfaces, the bottom surface of the fingerprint sensor disposed on the substrate, an active layer of the fingerprint sensor disposed towards the upper surface of the fingerprint sensor; a first integrated circuit chip disposed on the substrate and having at least one lead electrically connected to the flexible circuit substrate; and an adapter flexible circuit electrically bonded to the active layer of the fingerprint sensor, wherein the first integrated circuit chip is adapted to communicate with the fingerprint sensor through the adapter flexible circuit. The system on card has at least one top lamination layer, the top lamination layer having a window formed therein overlying the fingerprint sensor.

In embodiments, a method of forming prelam layers for use in forming laminated cards, includes the steps of: providing a flexible circuit substrate sheet having a plurality of areas corresponding to individual cards, each card area having: a fingerprint sensor disposed on the flexible circuit substrate sheet, the fingerprint sensor having upper and bottom surfaces, the bottom surface of the fingerprint sensor disposed on the substrate sheet, an active layer of the fingerprint sensor disposed towards the upper surface of the fingerprint sensor, and a first integrated circuit chip disposed on the flexible circuit substrate sheet; disposing an adapter flexible circuit sheet over the flexible circuit substrate sheet; electrically bonding the adapter flexible circuit sheet to the active layer of each fingerprint sensor; and after the bonding step, cutting the adapter flexible circuit sheet and flexible circuit substrate sheet into a plurality of individual prelam layers, each individual prelam layer comprising one or more of the plurality of areas corresponding to one or more of the individual cards. Each individual prelam layer has a respective flexible circuit substrate and adapter flexible circuit electrically bonded to the flexible circuit substrate, wherein the integrated circuit chip of each individual prelam layer is adapted to communicate with the fingerprint sensor of the each individual prelam layer through the respective adapter flexible circuit.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1:
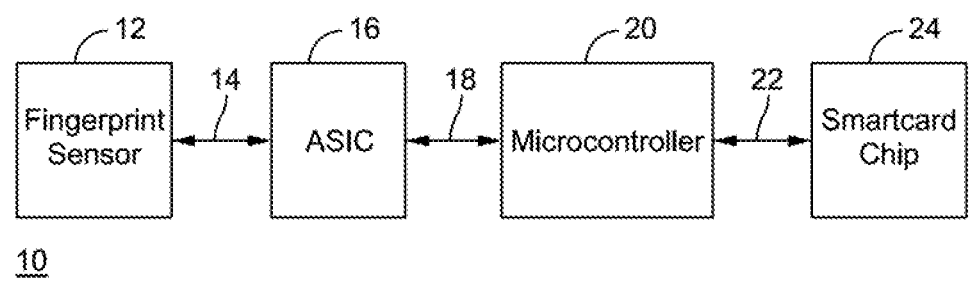
FIG. 1 shows an embodiment of an architecture for a biometric system on card.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. Likewise, terms concerning electrical "connections" and "coupling" refer to a relationship wherein components communicate with one another electrically either directly or indirectly through intervening structures unless described otherwise.

A smart card, chip card, or integrated circuit card (ICC) is any pocket-sized card with embedded integrated circuits. Smart cards are typically made of plastic, for example polyvinyl chloride or polyethylene terephthalate based polyesters, acrylonitrile butadiene styrene or polycarbonate.

FIG. 1 shows one possible architecture for a BSoC 10. A fingerprint sensor 12 captures an image of a fingerprint under control of an image capture ASIC 16 through an analog interface 14. The image capture ASIC 16 reads this image out and transfers it via an interface 18 (e.g., SPI or USB interface) to an embedded microcontroller unit (MCU) 20. The MCU 20 processes the image, extracts features and generates a fingerprint template, typically based on so-called "minutiae". In embodiments, such as for smart credit card embodiments, the fingerprint template is transferred to a smart card chip 24 (integrated circuit card chip, ICC) where the match is performed in a so-called "match on chip" application. The MCU 20 may also be provided with fingerprint matching functionality. Fingerprint sensor modules comprising an imaging sensor, A/D converter ASIC, and MCU with image processing, feature extraction, biometric template generation, and biometric matcher are available commercially from NEXT Biometrics AS of Oslo, Norway under product designation NB-1411. Fingerprint sensor modules comprising an imaging sensor, A/D converter ASIC, and host interface (such as SPI or USB) are available commercially from NEXT Biometrics AS under product designation NB-1011.

In alternative embodiments, functionality of the image capture ASIC 16, MCU 20, and/or smart card chip 24 can be integrated into a single chip or chips. In alternative embodiments, the functionality of the sensor 12 can be incorporated with the image capture ASIC 16 in one component and optionally also with the functionality of the MCU 20 and/or smart card chip 24.

Figure 2:
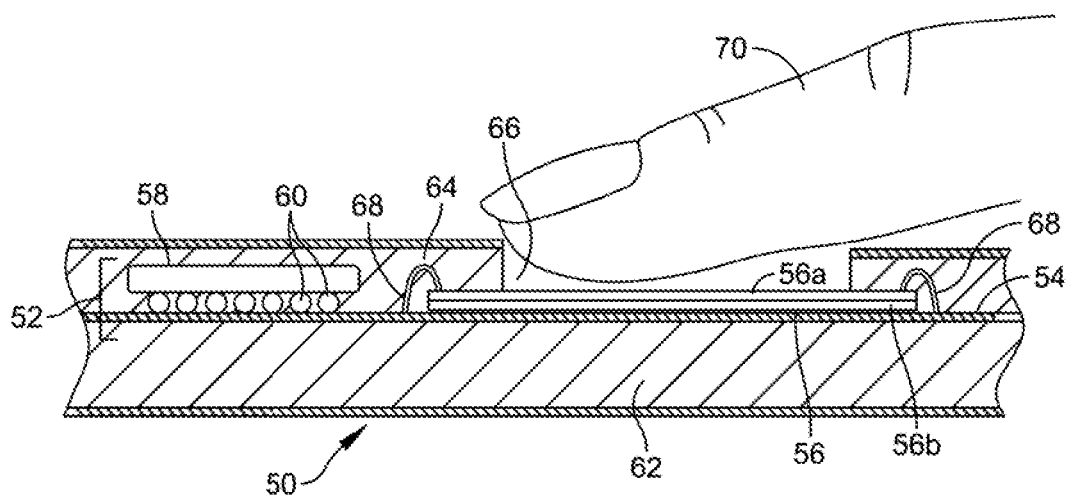
FIG. 2 is a partial cross-sectional view of a biometric system on card.

FIG. 2 illustrates a partial cross-sectional view of a laminated BSoC 50. The card 50 is formed from a prelam layer 52 (also referred to as a "core"), top lamination layer (or layers) 64 and bottom lamination layer (or layers) 62. By "prelam" it is meant a "prelaminated inlay" or lamination intermediate product for use during the production of lamination products (or other lamination intermediate products). The top and bottom lamination layers 62, 64, may be, for example, layers of polyvinyl chloride (PVC) or polyethylene terephthalate (PET) foil. The layers are laminated together under heat and/or pressure using processes familiar in the art of laminate card preparation. The prelam layer 52 includes a flexible printed circuit substrate 54 having mounted thereon a number of components, such as including the components described above in connection with FIG. 1. In embodiments, the flexible printed circuit substrate material is PET with conductive copper traces for connecting the mounted components to one another and/or to external interfaces. The prelam flexible printed circuit substrate 54 can be very think, such as for example around 80 μm in thickness. For purposes of illustration, the prelam layer 52 includes the fingerprint sensor 56 and an integrated circuit chip 58 mounted to the flexible printed circuit substrate 54. The integrated circuit chip may be, for example, the image capture ASIC described above in connection with FIG. 1. The flexible printed circuit substrate 54 includes traces for making connections between the fingerprint sensor 56 and the integrated circuit chip 58 as well as with the other components. The integrated circuit chip 58 is shown with its active side facing down (i.e., towards the substrate 54), with electrical connections to the flexible printed circuit substrate layer 52 made through conductive solder bumps 60. This connection technique is known as flip chip.

In embodiments described herein, the integrated circuit chip 58 may be a smart card controller chip. In such embodiments, the image capture functionality may be integrated into the sensor 56, which may be a silicon based finger print sensor.

The fingerprint sensor 56 generally includes a substrate 56b, which may be a glass substrate, and an active layer 56a formed thereover. In embodiments the fingerprint sensor is a flexible sensor, assuming a flexible substrate 56b such as a polysilicon substrate or thinned silicon substrate. In embodiments the sensor is a large area sensor such as is part of the NB-0510-SP chipset manufactured by NEXT Biometrics AS of Oslo, Norway, which includes a sensor die on glass substrate and a small package data capture ASIC responsible for A/D signal processing. These fingerprint sensors operate on the active thermal sensing principle, based on heat transfer. A low power heat pulse is applied to each sensor pixel over a short period of time and a response is measured. This type of fingerprint sensor may be produced with large area production processes such as low temperature polysilicon (LTPS) thin film transistors and devices. Sensor 56 may be secured to the substrate 54 using an adhesive or other suitable mechanical bonding technique. As can be seen in FIG. 2, a window 66 is formed in the top laminate layer(s) 64 exposing the active layer 56a of the sensor 56 at the upper surface of the sensor. It should be understood that the active layer 56a could correspond to the upper surface of the sensor 56 or it could be coated with an inactive layer or coating that permits image transfer. The active layer 56a also includes lead areas for making connections to the active layer 56a. When in use, a finger 70 is located over and on the sensor 56. At present there are no mass produced flexible smartcards of this type with embedded large area sensors. Because the active layer 56a of the sensor 56 must face upwards, wire bond connections 68, for example gold wires, must be used to connect the upper surface to the flexible printed circuit substrate 54. Not only do these wire bond connections complicate the manufacturing process, but they are not believed to be robust enough for use in a flexible card, which is subject to frequent bending stresses when used. And even if wire-bonding is technically feasible, for mass-production given cost, yield, and reliability considerations, direct-contact bonding technologies, such as flip-chip soldering or anisotropic conductive film (ACF) are superior.

All elements of the card should be flexible. Smaller and thinner components tend to be more flexible. Components such as the image read-out ASIC 16, 58 can be thinned, for example to have a thickness between or equal to about 120 μm and 450 μm, and bumped to allow soldering. The dimensions of the ASIC 16 are around 3.5 mm×3.5 mm. In embodiments, all components of biometric chipset on the card 50 can withstand torsional bending stress as per ISO/IEC 10373-1. Rigid fingerprint sensors do not withstand torsional bending stress as per ISO/IEC 10373-1 when integrated into a BSoC. This problem gets worse for large area sensors, e.g., sensors with a sense area of at least 169 mm$^2$.

In embodiments, the card 50 conforms with the standards for physical characteristics for identification cards set forth in ISO/IEC 7810:2003 Identification cards—Physical characteristics. In embodiments, the resulting card 50 is no larger than ID-1 size, as specified in ISO/IEC 7810:2003. Credit cards are a common example of ISO/IEC 7810 ID-1 sized cards. These cards have dimensions of 85.60×53.98 mm (3.370×2.125 in) and rounded corners with a radius of 2.88-3.48 mm. Other common examples include ATM cards, debit cards, and drivers licenses in many countries. This format is also used for personal identity cards in some countries, for automated fare collection system cards for public transport, and for retail loyalty cards.

Figure 10:
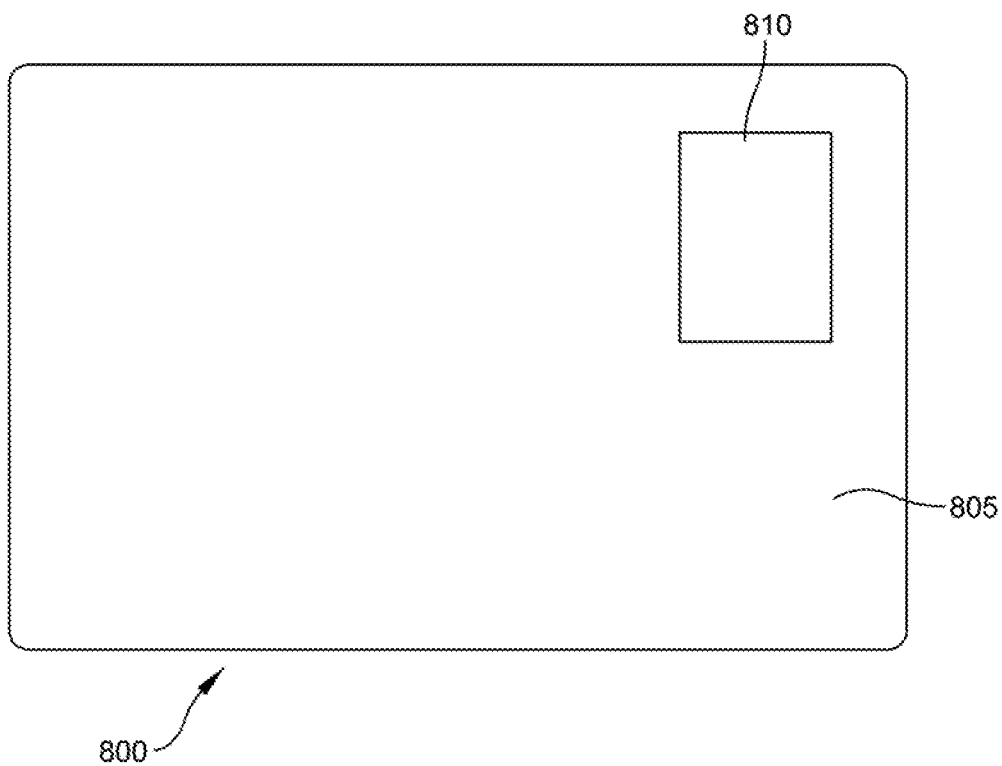
FIG. 10 illustrates an embodiment of a card having a large area fingerprint sensor.

FIG. 10 illustrates a top view of ID-1 sized card 800 with embedded fingerprint sensor 810 exposed through the top surface 805 of the card 800. It should be understood that the top surface of the card may have identification information (e.g., photograph of the user and/or name), account information (e.g., credit card account information), brand information or any other information related to the use of the card. Likewise, the back surface of the card (not shown) may have a signature block, magnetic stripe and/or other information such as CVV number.

In embodiments, the card 50 conforms with the standards for physical characteristics for biometric system on cards (BSoC) as defined in, for example, ISO/IEC 17839-2 Biometric System-on-Card—Part 2: Physical characteristics (draft standard). There is a relationship between fingerprint sensor area and the accuracy of the system, as measured by false match rates (FMR) and false non-match rates (FNMR). While smaller-sized sensors are easier to integrate into a BSoC, these sensors yield higher error rates. ISO/IEC 17839-2 Biometric System-on-Card gives a minimum area of 169 mm$^2$. The preferred sensor area is Federal Information Processing Standards (FIPS) Fingerprint Acquisition Profile (FAP)-10 (12.7 mm×16.5 mm; specification PIV-071006), and more preferably IPS FAP-20 (15.24 mm×20.32 mm; specification PIV-071006).

In embodiments, the height or thickness of the prelam layer of the card, including mounted components such as the fingerprint sensor, is between or equal to about 120-450 μm.

Figure 3:
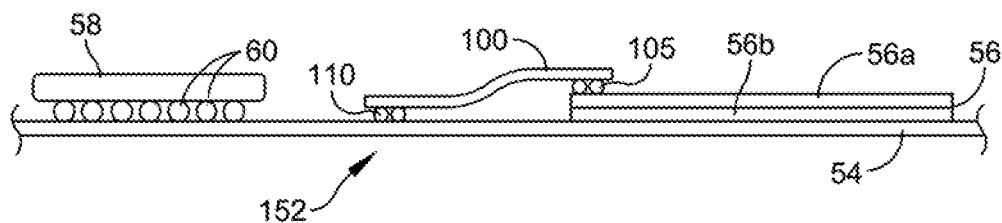
FIG. 3 illustrates an embodiment of a prelam layer for use in manufacturing a biometric system on card.

FIG. 3 illustrates an embodiment of a portion of a prelam layer 152 for use in manufacturing a BSoC as described above. As with FIG. 2, the prelam layer includes a flexible printed circuit substrate 54 having conductive traces for making connections between components (such as those described above in connection with FIGS. 1 and 2). Large area biometric sensor 56 is disposed on the flexible printed circuit substrate 54, with its active layer 56*a* facing upwards. In this embodiment, an adapter flexible circuit, for example a single sided flexible printed circuit (FPC) 100, connects the active side 56*a* of sensor 56 to the flexible printed circuit substrate 54. The FPC 100 is bonded to the active layer 56*a* of the sensor 56 by bonds 105 and to the substrate 54 by bonds 110. In embodiments, both bonds 105 and bonds 110 are anisotropic conductive film (ACF) bonds ACF bonding is an epoxy adhesive interconnect system that is used in liquid crystal display manufacturing to make the electrical and mechanical connections from the driver electronics to the glass substrates of the LCD. ACF bonding is also used in the smart card industry to connect antenna wires to prelam substrates for contactless and dual interface cards. The bonding process uses an ACF tape that has conductive particles in the conductive lines of the tape. During the ACF bonding process, heat and pressure are applied via a thermode (hot bar). The conductive particles are compressed between the traces or conductive bumps on the components being joined and thus provide electrical contact. The conductive particles become trapped into a permanent compressed form, with the particles distributed in a manner to minimize the chance of electrical shorting.

In one embodiment, the ACF bond 105 between the adapter FPC 100 and the sensor layer 56*a* is established. Next, the ACF bond 110 between the FPC 100 and the prelam substrate 54 is established.

In alternative embodiments, the bond 110 may be conductive solder bumps, such as bumps 60 that connect integrated circuit chip 58 to the substrate 54.

As noted above, the FPC 100 is a kind of flexible circuit, which is a technology for assembling electronic circuits by mounting electronic devices on flexible plastic substrates, such as a polyimide, PEEK or polyester film. Flexible circuits can be screen printed silver circuits on polyester. Flexible electronic assemblies may be manufactured using identical components used for rigid printed circuit boards, but allow the board to conform to a desired shape, or to flex during its use. Flexible printed circuits (FPC) are made with a photolithographic technology. An alternative way of making flexible foil circuits or flexible flat cables (FFCs) is laminating very thin (0.07 mm) copper strips in between two layers of PET. These PET layers, typically 0.05 mm thick, are coated with an adhesive which is thermosetting, and will be activated during the lamination process.

Single-sided flexible circuits have a single conductor layer made of either a metal or conductive (metal filled) polymer on a flexible dielectric film. Component termination features are accessible only from one side. Holes may be formed in the base film to allow component leads to pass through for interconnection, normally by soldering. Single sided flex circuits can be fabricated with or without such protective coatings as cover layers or cover coats, however the use of a protective coating over circuits is the most common practice.

As can be seen from FIG. 3, use of the FPC 100 to electrically connect the sensor 56 to the substrate 54, which in turn makes the electrical connection to the integrated circuit chip 58 (and/or other components), allows for formation of a robust prelam layer 152 that can withstand the bending stresses encountered by BSoCs. There are no wire bonds between the sensor 56 and the flexible substrate 54 that are potential points of failure under bending stresses. Further, the connection methodology can be adapted to mass production techniques, which allows for mass production of prelam layers for use in mass card productions, as described in more detail below.

Similar to FPC, in one embodiment, connections from the sensor active layer 56*a* to the substrate 54 may use tape automated bonding (TAB) rather than a FPC, such as FPC 100 in FIG. 3. TAB uses a conductive pattern of copper to form interconnections between a chip and a substrate. The pattern is pre-processed from a continuous copper tape on a dielectric carrier film. The TAB sheet is bonded to gold bumps on the sensor active layer. The leads of the TAB sheet are soldered to the substrate using a process called impulse soldering with a tool called a thermode. TAB is currently used in liquid crystal displays, electronic watches and other high volume consumer products.

Figure 4:
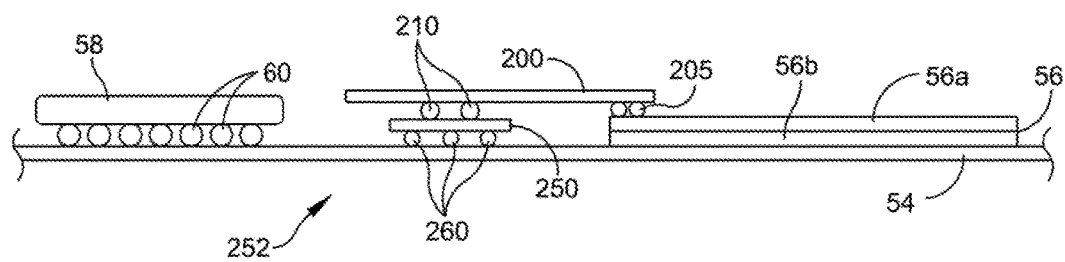
FIG. 4 illustrates another embodiment of a prelam layer for use in manufacturing a biometric system on card.

FIG. 4 shows another embodiment of a prelam layer 252 for use in manufacturing a BSoC as described above. The prelam layer 252 is identical in all respects to the prelam layer 152 only the connection of the sensor 56 to the flexible substrate 54 is modified. Specifically, the connection arrangement includes a first adapter flexible printed circuit (FPC) 200 connected to the active side 56a of the sensor 56 by bonds 205. The adapter FPC 200 is connected to a second adapter FPC 250 through bonds 210. The second adapter FPC 250 is connected to the flexible substrate layer 54 through bonds 260. In embodiments, the second adapter FPC 250 is a double-sided flexible circuit (FPC), for example including two conductive layers with an insulating layer between, and cover layers or films for the outer layer. The cover films are pre-routed to access copper from both sides using conductive through holes, such as plated thru holes (PTH) or other kind of conductive via. These conductive vias allow electrical connection from one side of the FPC to the other In embodiments, the bonds 260 are conductive solder bumps. In one embodiment, the solder bumps 260 are low silver (AG) containing lead-free solder balls, such as Sn/1.0Ag/0.5Cu, commonly called SAC105, or SAC305 (Sn/3.0Ag/0/5Cu) solder balls, with appropriate diameters for the given application.

In embodiments, both the bonds 210 and 205 are ACF bonds.

In one embodiment, described below in connection with FIGS. 8 and 9, the adapter FPC layer 200 can cover the entire upper surface of the prelam 252, except for a window over the active sensor layer 56a, so as to double as a cover foil of the smart card.

Figure 5:
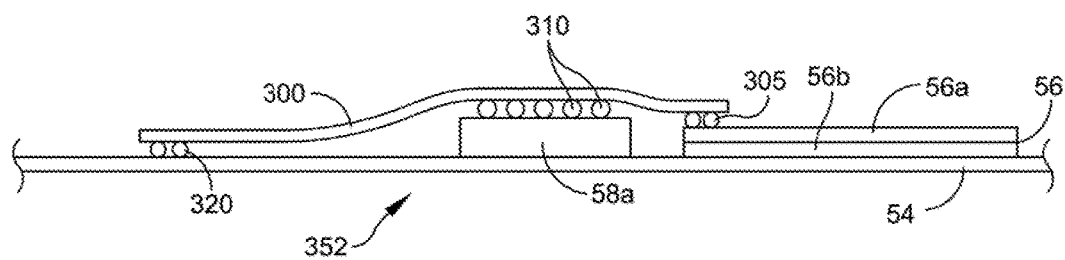
FIG. 5 illustrates another embodiment of a prelam layer for use in manufacturing a biometric system on card.

FIG. 5 shows another embodiment of a prelam layer 352 for use in manufacturing a BSoC as described above. The prelam layer 352 is identical in all respects to the prelam layer 152 and 252 only the connection of the sensor 56 to the flexible substrate 54 is modified and the orientation of the integrate circuit chip 58a is flipped respective to the integrate circuit chip 58. That is, the active side of the integrate circuit chip 58a now faces upwards (in the same direction as the active side 56a of the sensor 56), whereas the active side of integrate circuit chip 58 faces the flexible substrate 54. The connection arrangement includes a single-sided adapter flexible printed circuit (FPC) 300 connected to the active side of the sensor 56 by bonds 305. The adapter FPC 300 is connected to the active side of the integrate circuit chip 58a by bonds 310. And the adapter FPC 300 is also connected to the upper surface of the flexible substrate 54 by bonds 320. In this manner, the adapter FPC 300 connects the sensors 56 to the integrate circuit chip 58a and the integrate circuit chip 58a to the flexible substrate 54, which can also have other components described above in connection with FIG. 1 connected thereto.

In embodiments, the bonds 305, 310 and 320 are ACF bonds.

As with other embodiments, as described below in connection with FIGS. 8 and 9, the adapter FPC layer 300 can cover the entire upper surface of the prelam 352, except for a window over the active sensor layer 56a, so as to double as a cover foil of the smart card.

Figure 6:
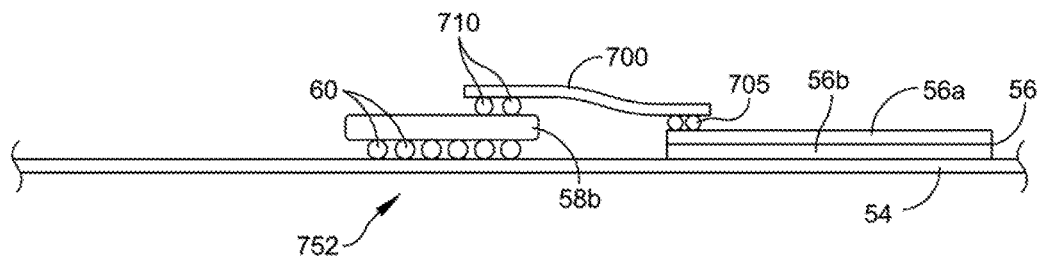
FIG. 6 illustrates another embodiment of a prelam layer for use in manufacturing a biometric system on card.

FIG. 6 shows another embodiment of a prelam layer 752 for use in manufacturing a BSoC as described above. As with prelam layers 152 and 252, the integrate circuit chip 58b is oriented with its active side facing the substrate 54, allowing for the integrate circuit chip 58b to have conductive solder bump bonds 60 to the substrate 54. The integrate circuit chip 58b has one or more conductive through silicon vias (TSV) that allow for electrical connections between the two sides of the integrate circuit chip 58b. Of course, the active side of the integrate circuit chip 58b could also face upwards, with the TSVs connecting that active layer to leads on the opposite side of the integrate circuit chip 58b that are coupled directly to the substrate 54. In this embodiment the connection arrangement includes a single-sided adapter flexible printed circuit (FPC) 700 connected to the active side of the sensor 56 by bonds 705. The adapter FPC 700 is connected to the active side of top side of integrate circuit chip 58b by bonds 710. In this manner, the adapter FPC 700 connects the sensors 56 directly to the integrate circuit chip 58b, which is also directly connected to the flexible substrate 54, which can also have other components described above in connection with FIG. 1 connected thereto. In embodiments, the integrated circuit chip 58b is an image capture ASIC.

In embodiments, the bonds 705 and 710 are ACF bonds.

As with other embodiments, as described below in connection with FIGS. 8 and 9, the adapter FPC layer 700 can extend to cover the entire upper surface of the prelam 752, except for a window over the active sensor layer 56a, so as to double as a cover foil of the smart card.

Figure 7:
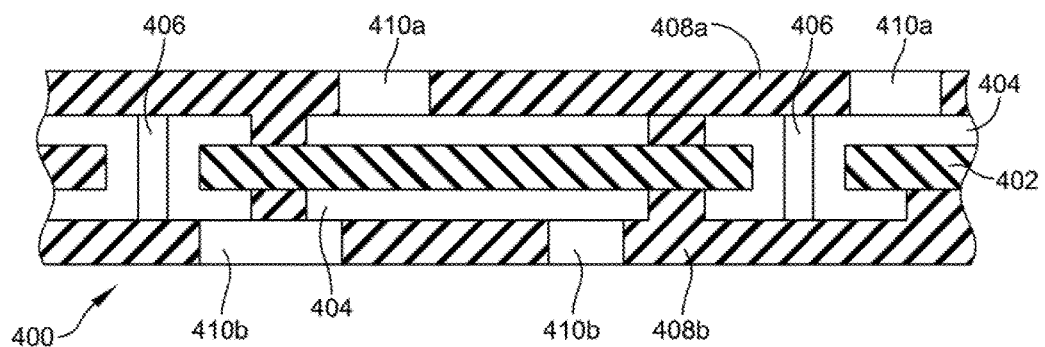
FIG. 7 is a cross-sectional view of an embodiment of a double-sided adapter flexible printed circuit.

FIG. 7 illustrates a cross-sectional view of an embodiment of a double-sided adapter flexible printed circuit (FPC) 400. The FPC 400 includes an insulating layer 402, such as a polyimide layer. Conductive layers 404 are formed on either side of the insulating layer. These layers may, for example, be copper foil layers. Through holes 406 are formed through the insulating layer 402 to allow for electrical connections between the conductive layers 404. Optional upper and lower insulating coverlay layers 408a, 408b are formed over the conductive layers 404. Upper and lower connection areas 410a, 410b are provided for making electrical connections to the conductive layers 404. These areas can be used for the solder or ACF bonds discussed above. It should be understood that a single-sided FPC may only have one conductive layer 404 and one coverlay layer (e.g., layer 408a or 408b) and would not require through holes 406.

In one embodiment, the flexible fingerprint sensor 56 is provided with conductive through vias to allow for sensor contacts to be placed on the underside of sensor substrate 56b, i.e., on the side opposite of active layer 56a. This allows the sensor to be bonded directly onto flexible substrate 54 of the prelam 52, such as by solder ball connection or ACF bonding.

Figure 8:
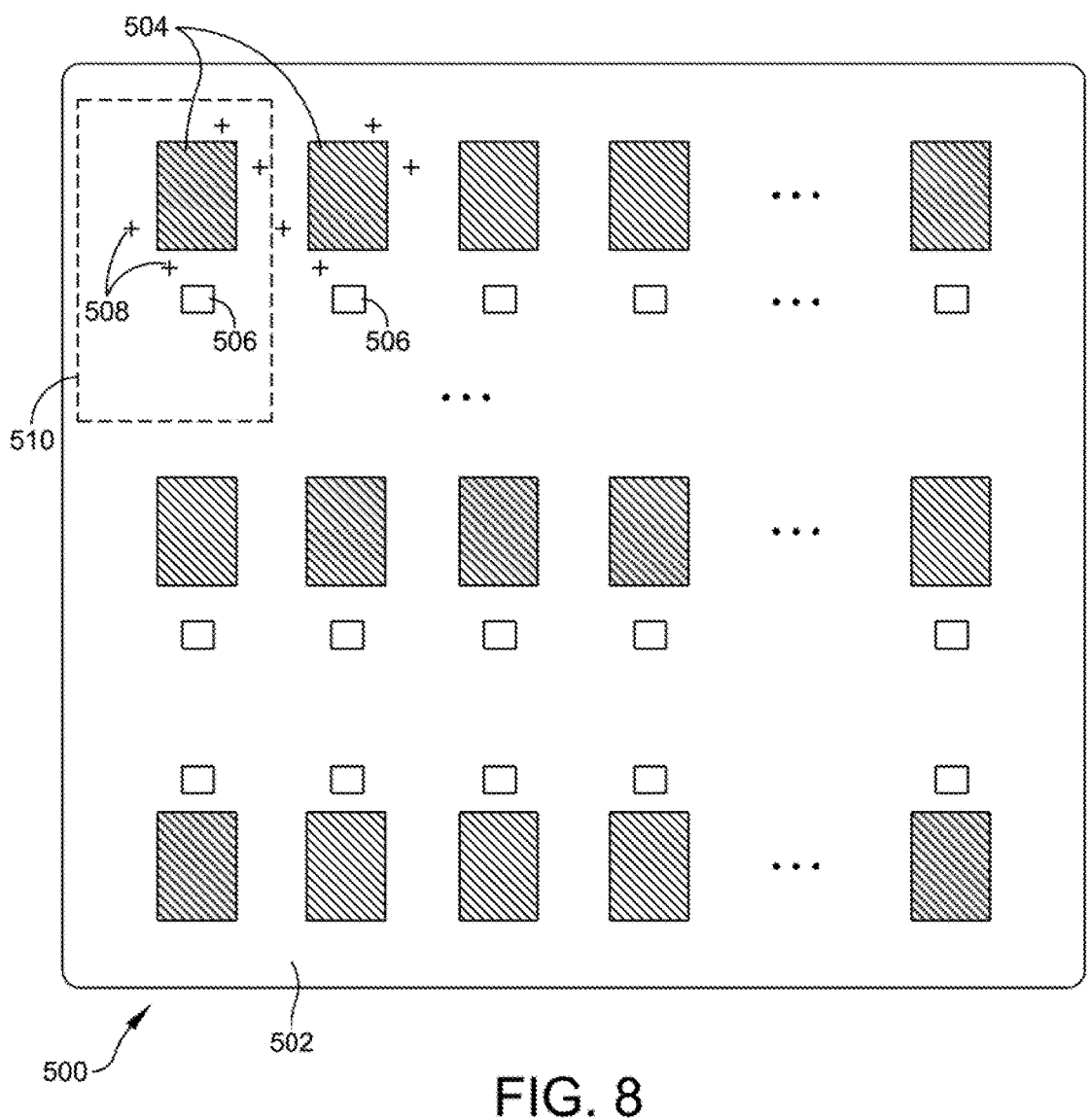
FIG. 8 illustrates an embodiment of prelam precursor sheet.

FIG. 8 illustrates a prelam precursor sheet 500. The prelam precursor sheet 500 includes a flexible printed circuit substrate 502 (for example, corresponding to substrate 54 discussed above) and a plurality of fingerprint sensors 504 (for example, corresponding to sensor 56 discussed above) disposed on the substrate 502. Alignment marks 508 denote the boundaries of the sensor active area. Other components, such as integrate circuit chip 506 (for example, corresponding to integrate circuit chip 58 discussed above) are also disposed on the substrate 502. These components can be arranged on the substrate 502 in a grid within areas 510 corresponding generally to the size and shape of a standard smart card (e.g., 85 mm×54 mm).

Figure 9:
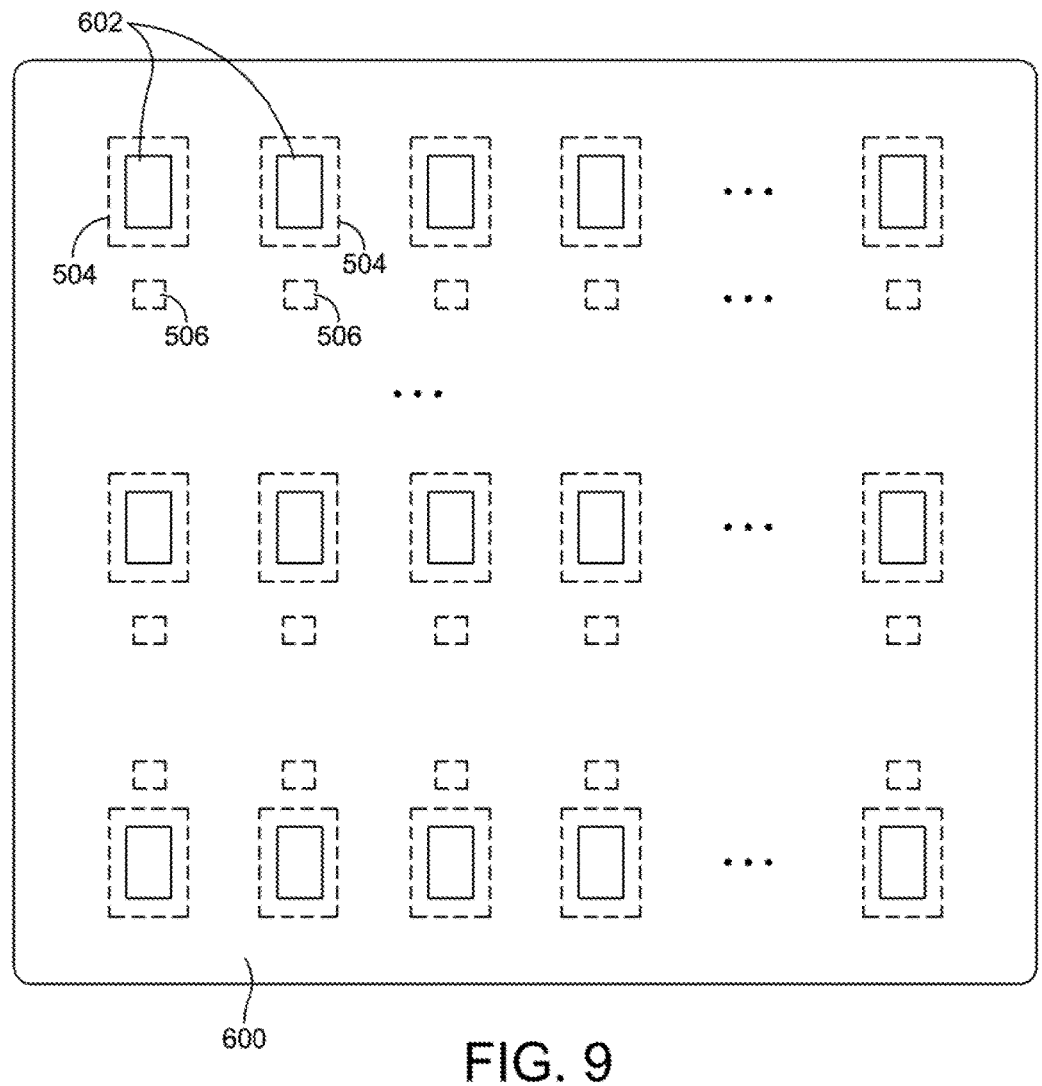
FIG. 9 illustrates an embodiment of an adapter flexible printed circuit sheet.

FIG. 9 shows an adapter FPC sheet 600 (corresponding to, for example, FPC 100, 200, 300 or 700 described above) overlaid on the layer 500 of FIG. 8. Windows 602 are precut or preformed in the sheet 600 to allow for exposure of the fingerprint sensors 504 underneath. The adapter FPC sheet 600 overlaps the sensors 504 and is electrically coupled to the active area of the sensors 504 by, for example, ACF bond, and electrically coupled to the substrate 502 and/or to the integrate circuit chip 506 via ACF bond and/or conductive solder ball bond as discussed above in connection with FIGS. 3 and 5. In the embodiment of FIG. 4, the layer 600 would be bonded to a second adapter FPC, such as adapter FPC 250.

After electrically bonding the FPC layer 600 to the prelam precursor sheet 500, the assembly (500, 600) can be laminated (using heat and/or pressure) with one or more additional layers (such as described above in connection with FIG. 2) and cut into individual BSoC cards. In embodiments, the FPC layer 600 doubles as the, or one of the, top lamination layers. In embodiments, heat and/or pressure is applied after the electrical bonding to form a physical bond between the precursor sheet 500 and the FPC layer 600. Alternatively, the physical bond may be created during the electrical bonding step.

Alignment marks 508 can be provided on the substrate 502 and/or adapter sheet 600 to allow for proper alignment between the sensors 504 and the FPC sheet 600. Since smart cards are also produced on sheets, the sensor can be optimized for card production.

While sheet 600 is shown as having a plurality of rows and columns of windows 602 and electrical connections (not shown) corresponding to individual cards, it should be understood that the sheet 600 could be provided as multiple sheets of individual rows of windows and electrical connections, or as multiple sheets of individual columns of windows and electrical connections. For example, assuming an N×M grid of card areas 510 on prelam precursor sheet 500, sheet 600 could be provided as a single sheet of N×M elements, or multiple sheets of any combination of rows and columns sufficient to provide N×M elements, i.e., in whatever form and number facilitates efficient manufacturing and proper alignment and electrical connection of the sheet(s) 600 to precursor sheet 500.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A prelam layer for use in forming a laminated card, comprising:
    a flexible circuit substrate;
    a fingerprint sensor disposed on the flexible circuit substrate, the fingerprint sensor having upper and bottom surfaces, the bottom surface of the fingerprint sensor being disposed on said substrate, an active layer of the fingerprint sensor disposed towards the upper surface of the fingerprint sensor;
    a first integrated circuit chip disposed on said substrate and having at least one lead electrically connected to the flexible circuit substrate; and
    an adapter flexible circuit electrically bonded to the active layer at the upper surface of the fingerprint sensor, wherein the integrated circuit chip is adapted to communicate with the fingerprint sensor through the adapter flexible circuit.

2. The prelam layer of claim 1, wherein the adapter flexible circuit is bonded to the active layer of the fingerprint sensor by anisotropic conductive film (ACF) bonding.

3. The prelam layer of claim 1, wherein the adapter flexible circuit is also electrically bonded to the flexible circuit substrate, wherein the adapter flexible circuit's electrical bond to the flexible circuit substrate couples the first integrated circuit to the fingerprint sensor.

4. The prelam layer of claim 3, wherein the adapter flexible circuit is bonded to the flexible circuit substrate and to the active layer of the fingerprint sensor by anisotropic film (ACF) bonding.

5. The prelam layer of claim 3, wherein the adapter flexible circuit is a single-sided adapter flexible printed circuit.

6. The prelam layer of claim 1,
    wherein an active layer of the first integrated circuit chip is oriented away from the upper surface of the flexible circuit substrate, and
    wherein the adapter flexible circuit is electrically bonded to at least one lead of the active layer of the first integrated circuit chip, wherein the first integrated circuit chip and the fingerprint sensor are adapted to directly communicate through the adapter flexible circuit.

7. The prelam layer of claim 6, wherein the adapter flexible circuit is also electrically bonded to the flexible circuit substrate, thereby electrically connecting the first integrated circuit chip to the flexible circuit substrate.

8. The prelam layer of claim 7, wherein the wherein the adapter flexible circuit is a single-sided adapter flexible printed circuit.

9. The prelam layer of claim 8, wherein the adapter flexible circuit is bonded to the fingerprint sensor, the first integrated circuit chip and the flexible circuit substrate by anisotropic film (ACF) bonding.

10. The prelam layer of claim 1, further comprising a second adapter flexible circuit, wherein the second adapter flexible circuit is a double-sided flexible circuit, wherein an upper side of the second adapter flexible circuit is electrically bonded to a bottom side of the adapter flexible circuit and a bottom side of the second adapter flexible circuit is electrically bonded to the flexible circuit substrate.

11. The prelam layer of claim 1, wherein the adapter flexible substrate covers the flexible circuit substrate and has a window formed therein overlying the fingerprint sensor.

12. The prelam layer of claim 1, wherein the first integrated circuit chip comprises an image capture ASIC.

13. The prelam layer of claim 12, further comprising a microcontroller electrically bonded to the flexible circuit substrate and adapted to communicate with the image capture ASIC through the flexible circuit substrate.

14. The prelam layer of claim 1, wherein the first integrated circuit chip is a smart card chip controller and the fingerprint sensor is adapted to provide a fingerprint template for comparison by the smart card chip controller.

15. The prelam layer of claim 1, wherein the fingerprint sensor has a sense area of at least 169 mm$^2$.

16. The prelam layer of claim 1, wherein a first side of the first integrated circuit chip is electrically bonded to the flexible circuit substrate and a second side, opposite the first side, is electrically bonded to the adapter flexible circuit.

17. The prelam layer of claim 16, wherein the first integrated circuit chip is an image capture ASIC, the prelam layer comprising at least one second integrated circuit chip adapted to communicate with the image capture ASIC through the flexible circuit substrate.

18. The prelam layer of claim 1, wherein the prelam layer has a total thickness between about 120-450 μm.

19. A biometric system on card, comprising:
    at least one bottom lamination layer;
    a prelam layer disposed over the at least one bottom lamination layer, the prelam layer comprising:

a flexible circuit substrate;
a fingerprint sensor disposed on the flexible circuit substrate, the fingerprint sensor having upper and bottom surfaces, the bottom surface of the fingerprint sensor disposed on said substrate, an active layer of the fingerprint sensor disposed towards the upper surface of the fingerprint sensor;
a first integrated circuit chip disposed on said substrate and having at least one lead electrically connected to the flexible circuit substrate; and
an adapter flexible circuit electrically bonded to the active layer at the upper surface of the fingerprint sensor, wherein the first integrated circuit chip is adapted to communicate with the fingerprint sensor through the adapter flexible circuit; and
at least one top lamination layer, the top lamination layer having a window formed therein overlying the fingerprint sensor.

20. The biometric system on card of claim 19,
wherein the first integrated circuit chip is a smart card chip controller flip chip bonded to the flexible circuit substrate;
wherein the adapter flexible circuit is electrically bonded to the flexible circuit substrate;
wherein the adapter flexible circuit's electrical bond to the flexible circuit substrate allows the smart card controller to communicate with the fingerprint sensor through the adapter flexible circuit.

21. The biometric system on card of claim 19,
wherein the first integrated circuit chip has an active side oriented away from an upper surface of the flexible circuit substrate, and
wherein the adapter flexible circuit is electrically bonded to at least one lead at the active side of the first integrated circuit chip, whereby the first integrated circuit chip and the fingerprint sensor are adapted to directly communication through the adapter flexible circuit, and
wherein the adapter flexible circuit is also bonded to flexible circuit substrate, whereby the first integrated circuit chip is adapted to directly communicate with the flexible circuit substrate through the adapter flexible circuit.

22. The biometric system on card of claim 19, wherein the least one top lamination layer includes the adapter flexible circuit, the adapter flexible circuit having a window formed therein overlying, the fingerprint sensor.

23. The biometric system on card of claim 19, wherein the first integrated circuit chip is an image capture ASIC, wherein the prelam layer further comprises at least one second integrated circuit electrically bonded to said flexible circuit, substrate and adapted to communicate with the image capture ASIC through the flexible circuit substrate.

24. A method of forming prelam layers for use in forming laminated cards, comprising the steps of:
providing a flexible circuit substrate sheet having a plurality of areas corresponding to individual cards, each card area having:
a fingerprint sensor disposed on the flexible circuit substrate sheet, the fingerprint sensor having upper and bottom surfaces, the bottom surface of the fingerprint sensor disposed on said substrate sheet, an active layer of the fingerprint sensor disposed towards the upper surface of the fingerprint sensor, and
a first integrated circuit chip disposed on said flexible circuit substrate sheet;
disposing an adapter flexible circuit sheet over the flexible circuit substrate sheet;
electrically bonding the adapter flexible circuit sheet to the active layer of each fingerprint sensor; and
after the bonding step, cutting the adapter flexible circuit sheet and flexible circuit substrate sheet into a plurality of individual prelam layers, each individual prelam layer comprising one or more of the plurality of areas corresponding to individual cards, each individual prelam layer having a respective flexible circuit substrate and adapter flexible circuit electrically bonded to the flexible circuit substrate, wherein the integrated circuit chip of each individual prelam layer is adapted to communicate with the fingerprint sensor of the each individual prelam layer through the respective adapter flexible circuit.

25. The method of claim 24, the flexible circuit substrate comprises an array of said plurality of areas corresponding to individual cards, said array comprising a plurality of rows and columns of said areas, wherein the adapter flexible circuit sheet comprises two or more adapter flexible circuit sheets, each of said two or more adapter flexible circuit sheets disposed over a respective subset of the plurality of areas.

* * * * *

UNITED STATES PATENT AND TRADEMARK OFFICE
CERTIFICATE OF CORRECTION

PATENT NO. : 9,792,516 B2  
APPLICATION NO. : 15/006713  
DATED : October 17, 2017  
INVENTOR(S) : Vogel et al.

Page 1 of 1

It is certified that error appears in the above-identified patent and that said Letters Patent is hereby corrected as shown below:

In the Claims

In Claim 4, at Column 10, Line 5: insert --"conductive"-- after the word --"anisotropic"-- and before the word --"film"--.

In Claim 9, at Column 10, Line 30: insert --"conductive"-- after the word --"anisotropic"-- and before the word --"film"--.

Signed and Sealed this  
Eighth Day of January, 2019

Andrei Iancu  
*Director of the United States Patent and Trademark Office*